United States Patent
Oddoart et al.

(10) Patent No.: US 9,088,210 B2
(45) Date of Patent: Jul. 21, 2015

(54) DUAL MODE POWER SUPPLY WITH INDUCTOR DETECTION

(75) Inventors: Ludovic Oddoart, Opio (FR); Olivier Tico, St Lys (FR)

(73) Assignee: CAMBRIDGE SILICON RADIO LIMITED, Cambridge, Cambridgeshire (GB)

( * ) Notice: Subject to any disclaimer, the term of this patent is extended or adjusted under 35 U.S.C. 154(b) by 320 days.

(21) Appl. No.: 13/536,550

(22) Filed: Jun. 28, 2012

(65) Prior Publication Data

US 2013/0021012 A1    Jan. 24, 2013

(30) Foreign Application Priority Data

Jul. 20, 2011    (GB) .................................... 1112470.8

(51) Int. Cl.
*H02M 3/156*    (2006.01)
*G05F 1/563*    (2006.01)

(52) U.S. Cl.
CPC ..................................... *H02M 3/156* (2013.01)

(58) Field of Classification Search
CPC ...................................................... H02M 3/156
USPC .................. 323/22–224, 266, 268–271, 259, 323/281–285
See application file for complete search history.

(56) References Cited

U.S. PATENT DOCUMENTS

| | | | | |
|---|---|---|---|---|
| 30,779 A | * | 11/1860 | Feng | ................................ 111/63 |
| 5,793,208 A | * | 8/1998 | Ito | ................................ 324/253 |
| 7,307,412 B1 | * | 12/2007 | Broach | ..................... 324/117 R |
| 7,526,266 B2 | | 4/2009 | Al-Mahdawi | |
| RE41,061 E | * | 12/2009 | Zinn | .............................. 323/266 |
| 8,233,872 B2 | | 7/2012 | Nagai et al. | |
| 8,285,214 B2 | | 10/2012 | Sadeghfam et al. | |
| 8,351,850 B2 | | 1/2013 | Van Aken et al. | |
| 8,606,212 B2 | | 12/2013 | Sheikholeslami | |
| 2002/0158641 A1 | * | 10/2002 | Stanimirov et al. | ........... 324/654 |
| 2003/0054788 A1 | | 3/2003 | Sugar et al. | |
| 2005/0096000 A1 | | 5/2005 | Petrovic et al. | |

(Continued)

FOREIGN PATENT DOCUMENTS

| | | |
|---|---|---|
| DE | 102012012099 A1 | 12/2012 |
| DE | 102012013632 A1 | 1/2013 |

(Continued)

OTHER PUBLICATIONS

Nabeshima, T.; Sato, T.; Nishijima, K.; Yoshida, S., "A novel control method of boost and buck-boost converters with a hysteretic PWM controller," IEEE Power Electronics and Applications, 2005 European Conference on.*

(Continued)

*Primary Examiner* — Harry Behm
*Assistant Examiner* — Peter Novak
(74) *Attorney, Agent, or Firm* — K&L Gates LLP

(57) ABSTRACT

The present application relates to a power supply module which is operable in a switch mode and in a linear mode. The power supply module includes a detector for detecting the presence of an inductor at an output node of the power supply module. If an inductor is detected, the detector outputs a signal indicating the presence of the inductor, and the power supply module selects the switch mode as its operating mode. If no inductor is detected, the detector outputs a signal indicative of the absence of an inductor and the power supply module selects its linear mode as its operating mode.

20 Claims, 3 Drawing Sheets

(56) References Cited

U.S. PATENT DOCUMENTS

| | | |
|---|---|---|
| 2006/0098765 A1 | 5/2006 | Thomas et al. |
| 2006/0158165 A1 | 7/2006 | Inn et al. |
| 2006/0250825 A1* | 11/2006 | Grigore ............... 363/21.01 |
| 2009/0075591 A1 | 3/2009 | Murdoch et al. |
| 2009/0278685 A1 | 11/2009 | Potyrailo et al. |
| 2009/0295344 A1 | 12/2009 | Qu |
| 2010/0002803 A1 | 1/2010 | Murdoch et al. |
| 2010/0054350 A1 | 3/2010 | Kojima |
| 2012/0105029 A1 | 5/2012 | Kawagoe |
| 2012/0322399 A1 | 12/2012 | Sheikholeslami |
| 2013/0003892 A1 | 1/2013 | McFarthing |
| 2013/0017782 A1 | 1/2013 | Tay et al. |

FOREIGN PATENT DOCUMENTS

| | | |
|---|---|---|
| DE | 102012013120 A1 | 3/2013 |
| EP | 0515187 A3 | 11/1992 |
| EP | 2221984 A1 | 8/2010 |
| GB | 2428940 A | 2/2007 |
| GB | 2484103 A | 4/2012 |
| GB | 2491883 A | 12/2012 |
| GB | 2492362 A | 1/2013 |
| GB | 2493000 A | 1/2013 |
| GB | 2497775 A | 1/2013 |
| WO | WO 2006/076669 A1 | 7/2006 |
| WO | WO 2006/088583 A2 | 8/2006 |
| WO | WO2009/128032 A1 | 10/2009 |
| WO | WO 2010/041173 A1 | 4/2010 |

OTHER PUBLICATIONS

Hewlett Packard. Agilent 4263B LCR Meter User Guide. Dec. 2000. pp. 1-48 (1-1 through 1-3, 2-1 through 2-23, 3-1 through 3-14).*

United Kingdom Intellectual Property Office Search Report for Application No. GB1112470.8 dated Oct. 19, 2012.

United Kingdom Intellectual Property Office Combined Search and Examination Report for Application No. GB1112470.8 dated Oct. 22, 2012.

* cited by examiner

DUAL MODE POWER SUPPLY WITH INDUCTOR DETECTION

CROSS REFERENCE TO RELATED APPLICATION

This application claims priority under 35 U.S.C. §119 of United Kingdom Application No. GB1112470.8, titled "A POWER SUPPLY MODULE," filed Jul. 20, 2011, and incorporated herein by reference in its entirety.

TECHNICAL FIELD

The present application relates to a power supply apparatus, and in particular to a dual mode power supply module which is operable in a switch mode and a linear mode.

BACKGROUND TO THE INVENTION

Semiconductor integrated circuits (ICs), which are commonly referred to as chips, require a power supply to operate. For chips where high power efficiency is required a switch mode power supply is typically used as the power supply for the chip. Where high power efficiency is not required, a less costly linear power supply may be used. These power supplies are typically provided as a module on the chip, which receives an unregulated power supply from an external source such as a battery. The internal power supply module is powered from this external power supply, and in turn provides power to the rest of the chip.

A class of known power supply modules is able to operate in both switch mode and linear mode, with the operating mode being selectable according to the requirements of the chip in which the power supply module is used. Power supply modules of this type are used in many different chips, with each chip setting the operating mode of the power supply module. A difficulty arises with this approach, however, in that the chip must indicate to the power supply module which operating mode it must adopt before the core functional elements of the chip have been initialized (booted up). In practice this is often achieved by the use of a one-time programmable element in the chip, which is pre-set during production of the chip to hold a value indicative of the required operating mode of the power supply module. Thus, when the chip is powered up from an external power supply, the operating mode of the power supply module is determined by the value stored in the one time programmable element. This approach adds to the bill of materials cost of the chip, due to the additional cost of the one-time programmable element. The one-time programmable element also increases the physical size of the chip, whilst one or more pins on the chip must be reserved for programming the one-time programmable element during production. Additionally, the use of a one-time programmable element in this way adds an additional step (of programming the one-time programmable element) to the production process, and can lead to difficulties in post-production testing of the chip.

SUMMARY OF INVENTION

The present application relates to a power supply module which is operable in a switch mode and in a linear mode. The power supply module includes a detector for detecting the presence of an inductor at an output node of the power supply module. If an inductor is detected, the detector outputs a signal indicating the presence of the inductor, and the power supply module selects the switch mode as its operating mode. If no inductor is detected, the detector outputs a signal indicative of the absence of an inductor and the power supply module selects its linear mode as its operating mode.

According to a first aspect of the present invention there is provided a dual-mode power supply module comprising: a switch operable to connect an output node of the power supply module to a power supply of the power supply module; a detector for detecting a signal at the output node indicative of the presence of an inductor at the output node; and means for selecting the operating mode of the power supply module according to a signal output by the detector.

The dual mode power supply module detects the presence of an inductor at an output node of the power supply module, and automatically selects the operating mode of the power supply module accordingly. For example, the presence of an inductor at the output node indicates that the power supply module should operate in a switch mode, whilst the absence of an inductor indicates that the power supply module should operate in a linear mode. By automatically detecting the presence or absence of an inductor and selecting its operating mode in this way, the dual mode power supply module obviates the need for costly and physically large one-time programmable elements in chips incorporating the power supply module. This reduces the bill of materials cost and physical size of the chips, and facilitates production and post-production testing of the chips.

The detector may be configured to compare a voltage at the output node to a reference voltage.

The detector may be configured to output a signal indicative of the presence of an inductor at the output node if the voltage at the output node is greater than the reference voltage.

Additionally or alternatively, the detector may be configured to output a signal indicative of the absence of an inductor at the output node if the voltage at the output node is less than the reference voltage.

The dual mode power supply may further comprise a latch which receives the output of the detector and outputs a signal indicative of the presence or absence of an inductor at the output node after a predetermined time period.

The predetermined time period may be defined by a timer.

The timer may be configured to commence when the switch is operated to connect the output node to the power supply of the power supply module.

The detector may comprise a comparator.

According to a second aspect, the invention provides a method of operating a dual mode power supply module, the method comprising: connecting an output node of the power supply module to a power supply of the power supply module; detecting a signal at the output node indicative of the presence of an inductor at the output node; and selecting the operating mode of the power supply module according to a signal output by the detector.

Detecting the signal at the output node may comprise comparing a voltage at the output node to a reference voltage.

The method may further comprise outputting a signal indicative of the presence of an inductor at the output node if the voltage at the output node is greater than the reference voltage.

The method may further comprise outputting a signal indicative of the absence of an inductor at the output node if the voltage at the output node is less than the reference voltage.

The method may further comprise receiving the signal indicative of the presence or absence of an inductor at an input of a latch and outputting at an output of the latch a signal indicative of the presence or absence of an inductor after a predetermined time period.

The predetermined time period may be defined by a timer.

The method may further comprise commencing operation of the timer when the output node is connected to the power supply of the power supply module.

Detection of the voltage at the output node may be performed by a comparator.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
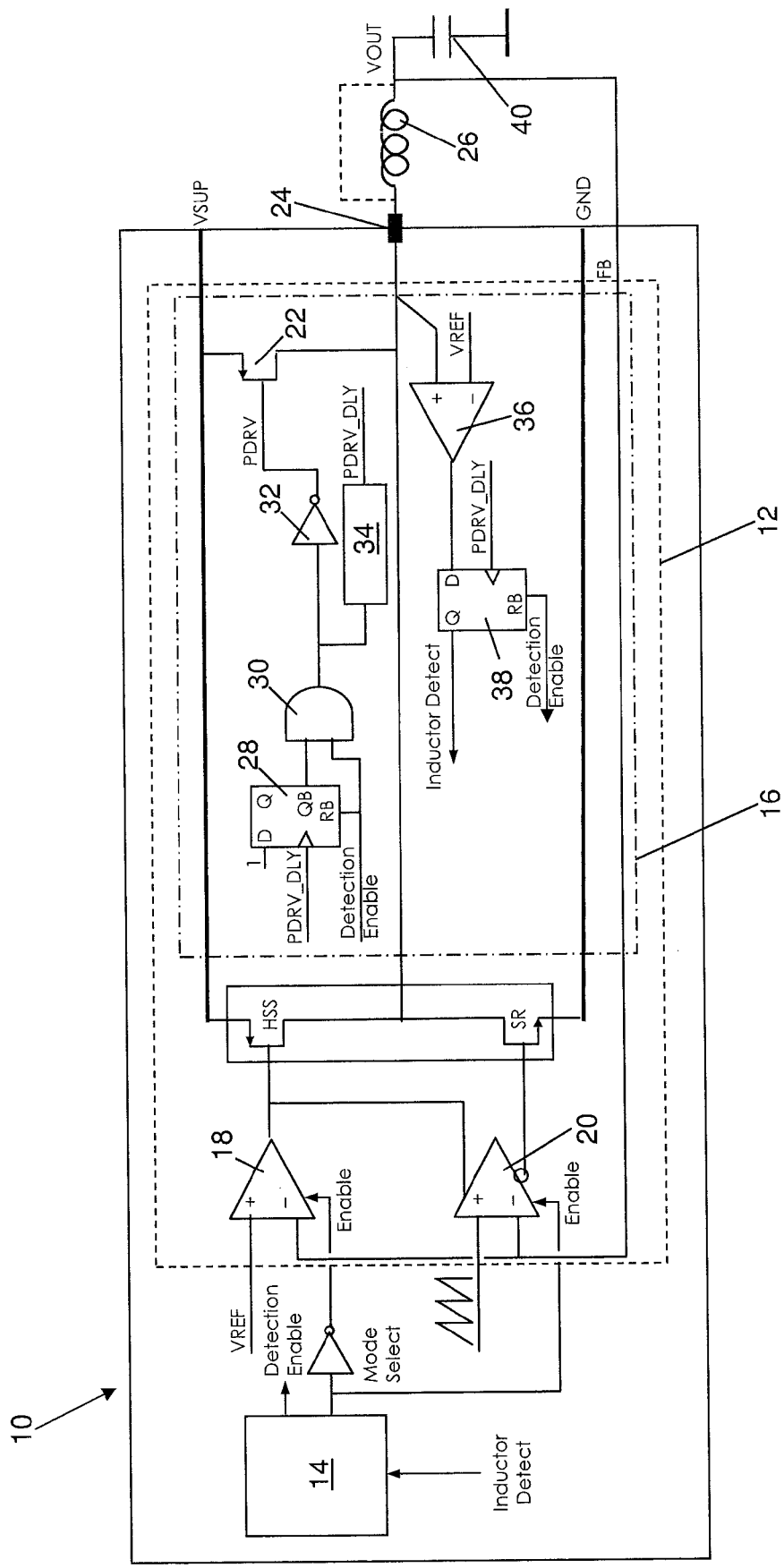
FIG. 1 is a schematic diagram illustrating part of a chip incorporating a power supply module.

FIG. 1 is a block diagram illustrating part of an integrated circuit or chip. The chip, shown generally at 10, includes a dual mode power supply module 12 that can operate in either a switch mode or a linear mode, depending on the requirements of the chip 10.

The chip 10 includes a start-up sequencer 14, which initializes the chip 10 when it is first powered up. The start-up sequencer 14 has an "Inductor Detect" input which receives a signal from an inductor detector sub-system 16 of the power supply module 12, and a "Mode Select" output which selectively enables a linear mode controller 18 or a switch mode controller 20 of the dual mode power supply module 12 of the chip 10 according to the input received from the inductor detector sub-system 16. A further "Detection Enable" output of the start-up sequencer 14 is provided to enable the inductor detector sub-system 16.

The inductor detector sub-system 16 includes a switch 22 which is operable to connect an output 24 of the power supply module 12 to an external power supply which is used to power the chip 10. In this example the switch 22 is a p-channel MOSFET, but it will be appreciated that any appropriate electrically operable switch could be used.

The output 24 of the power supply module 12 may be connected to an inductor 26, in which case the power supply module 12 should operate in its switch mode, and thus the switch mode controller 20 should be enabled and the linear mode controller 18 should be disabled. On the other hand, if no inductor 26 is present, the power supply module 12 should operate in its linear mode, by enabling the linear mode controller 18 and disabling the switch mode controller 20.

The inductor detector sub-system 16 is configured to detect the presence or absence of an inductor 26 at the output 24 of the power supply module 12 and transmit a signal indicating the presence or absence of an inductor 26 to the start-up sequencer 14.

The switch 22 is controlled in this example by a D-type flip flop 28, which initially receives at its D input a logic level 1 or high signal. Thus, an output QB of the flip flop 28 is initially low when the chip 10 is first powered up.

The output QB of the flip flop 28 is connected to one input of a two input AND gate 30, whose other input is connected to the Detection Enable output of the start-up sequencer 14. The Detection Enable output of the start-up sequencer 14 is also connected to a reset (R) input of the flip flop 28.

The output of the AND gate 30 is connected to an input of a NOT gate 32, whose output is connected to the switch 22, to control the operation of the switch 22. The output of the NOT gate 32 is also connected to a trigger input of a monostable timer 34, which, when triggered by an input signal, outputs a high output signal after a predetermined time period. The output of the timer 34 is connected to a strobe input of the flip flop 28 to control the duration of operation of the flip flop 28 and thus the duration of operation of the inductor detector sub-system 16, as will be explained in more detail below.

The inductor detector sub-system 16 also includes a detector for detecting the presence (or absence) of an inductor 26 at the output 24 of the power supply module 20. In this example the detector is a comparator 36, which may be, for example, an appropriately configured operational amplifier (op-amp). The comparator 36 receives, at an inverting input, a reference voltage VREF. A non-inverting input of the comparator 36 is connected to the output 24 of the power supply module 12 such that the comparator 36 monitors the voltage at the output 24 of the power supply module 12.

The output of the comparator 36 is connected to an input of a D-type flip flop 38, whose Q output is connected to the Inductor Detect input of the start-up sequencer 14. The flip flop 38 has a strobe input which is connected to the output of the timer 34 such that when a signal is received from the timer 34 (after the predetermined time period) the output of the flip flop 38 is latched.

When the chip 10 is first powered up (by being connected to an external power supply, for example), the start-up sequencer 14 outputs a high signal at its Detection Enable output. This resets the flip flop 28, causing its QB output to go high. As both of its inputs are now high, the output of the AND gate 30 goes high, triggering the timer 34, and causing the output of the NOT gate 32 to go low. This in turn causes the switch 22 to turn on, allowing current to flow from the external power supply to the output 24 of the power supply module 12.

If an inductor 26 is present in the output, the voltage at the output 24 of the power supply module 12 immediately rises to close to the voltage VSUP of the external power supply and then falls away as the inductor 26 charges. The rate of this decrease in voltage is governed by the inductance L of the inductor and the resistance R of the switch 22 when it is switched on. The voltage at the output 24 of the power supply module 20 falls to zero with a time constant of L/R seconds.

If no inductor 26 is present at the output 24 of the power supply module 12, the voltage at the output 24 of the power supply module 12 rises with a time constant equal to the on-resistance R of the switch 22 multiplied by the capacitance C of a decoupling capacitor 40 connected between the output 24 of the power supply module 12 and ground.

The reference voltage VREF at the inverting input of the comparator 36 is selected such that if the comparator 36 detects, at its non-inverting input, a voltage indicating the presence of an inductor 26 at the output 24 of the power supply module 12, i.e. a high voltage that gradually falls away, its output goes high, whereas if a voltage indicative of the absence of an inductor 26 at the output 24 of the power supply module 12 is detected at the non-inverting input of the comparator 36, its output goes low. In other words, the reference voltage VREF at the inverting input of the comparator 36 is selected to be between 0v and the voltage VSUP of the external power supply.

The output of the comparator 36 is input to the D type flip flop 38, which also has a strobe input connected to the output of the timer 34, such that when the predetermined time period has elapsed, the timer 34 inputs a signal to the strobe input of the flip flop 38 causing its output to latch with the value at its input at that time. This delay in latching the output of the flip flop 38 ensures that voltage spikes that may arise when the switch 22 is initially closed do not cause the start-up sequencer 14 incorrectly to enable the switch mode controller 20.

The output of the flip flop 38 is connected to the Inductor Detect input of the start-up sequencer 14, such that if on expiry of the predetermined time period the output of the flip flop 38 is high, indicating the presence of an inductor 26, the start-up sequencer 14 enables the switch mode controller 20 of the power supply module 12, causing the power supply module 12 to operate in switch mode. On the other hand, if on expiry of the predetermined time period the output of the flip flop 38 is low, indicating the absence of an inductor 26, the Inductor Detect input of the start-up sequencer 14 receives a low input, and the start-up sequencer enables the linear mode controller 18 of the power supply module 12, causing the power supply module 12 to operate in its linear mode.

It will be appreciated that the predetermined time period set by the timer 34 is important to the operation of the inductor detector sub-system 16, since it is the value of the output of the comparator 36 and therefore the flip flop 38 at the expiry of that time period which determines whether the start-up sequencer 14 enables the linear mode controller 18 or the switch mode controller 20. Thus, the timer 34 sets a detection window in which the presence or absence of an inductor 26 at the output of the power supply module 12 is detected.

Figure 2:
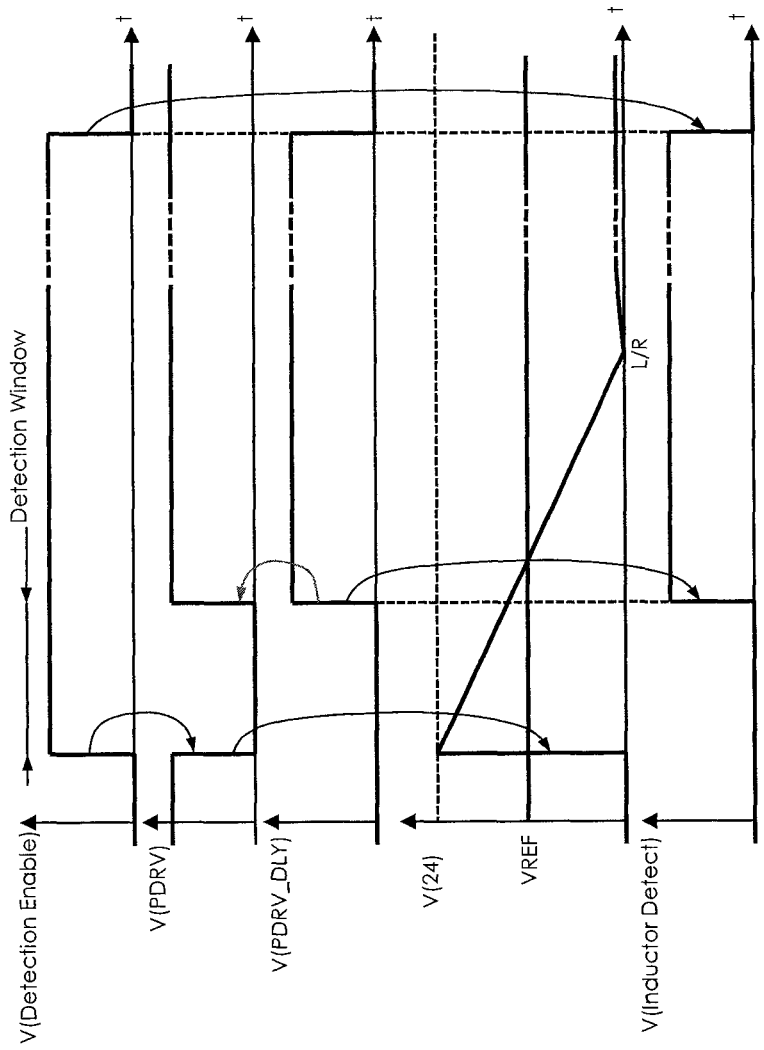
FIG. 2 is a timing diagram illustrating timing information of the power supply module used in the chip of FIG. 1 when an inductor is present at the output of the power supply module.

FIG. 2 provides a series of timing diagrams to illustrate the operation of the inductor detector sub-system 16 when an inductor 26 is present at the output of the power supply module 12.

The upper trace in FIG. 2 shows the voltage at the Detect Enable output of the start-up sequencer 14 over time. As can be seen, when the Detect Enable signal is output by the start-up sequencer 14, the voltage at the Detect Enable output goes high The second trace in FIG. 2 shows the value of the signal that is output by the NOT gate 32 to the switch 22 over the time period shown in the upper trace. As can be seen, this signal is initially high, so the switch is turned off. When the Detect Enable signal is output by the start-up sequencer 14 the signal input to the switch 22 is low, causing the switch 22 to switch on. After the predetermined time period of the timer 34 (the detection window) has elapsed this signal reverts to its initial high state, turning the switch 22 off.

The third trace in FIG. 2 shows the voltage at the output of the timer 34 over the same time period as that shown in the upper trace. As can be seen, the output of the timer 34 is low until a predetermined time period after triggering of the timer 34 has elapsed, at which point its output goes high.

The fourth trace in FIG. 2 shows the voltage at the output 24 of the power supply module 12 over the time period shown in the other traces. When the Detect Enable signal is output by the start-up sequencer 14 the voltage at the output 24 rises almost to the supply voltage VSUP of the external power supply, before falling back to 0 with a time constant of L/R.

Finally, the fifth trace in FIG. 2 shows the output of the flip flop 38 over the time period shown in the other traces of FIG. 2. It can be seen that the output of the flip flop 38 does not change until the time period set by the timer 32 has elapsed. At this point, the output voltage of the power supply module 12 is above the reference voltage VREF at the inverting input of the comparator 36, and thus the output of the flip flop 38 latches high, causing the start-up sequencer 14 to enable the switch mode controller 20 and disable the linear mode controller 18. This delay in outputting a signal from the flip flop 38 to the start-up sequencer 14 ensures that voltage spikes that may arise when the switch 22 is initially closed do not cause the start-up sequencer 14 incorrectly to enable the switch mode controller 20.

Figure 3:
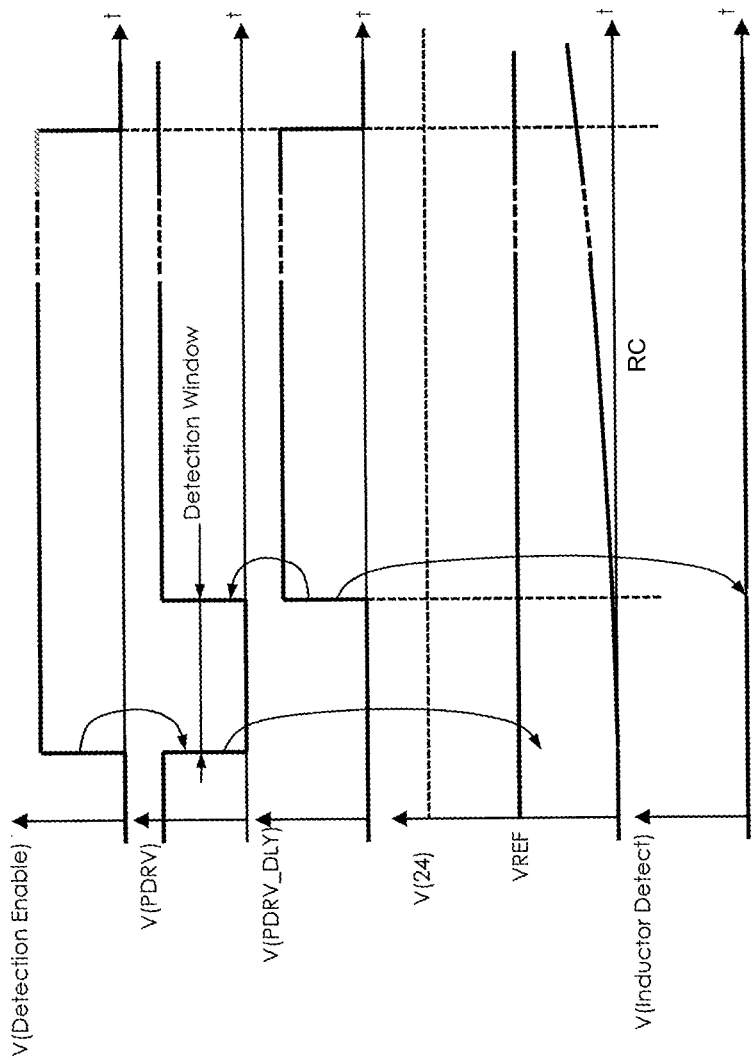
FIG. 3 is a timing diagram illustrating timing information of the power supply module used in the chip of FIG. 1 when no inductor is present at the output of the power supply module.

FIG. 3 provides a series of timing diagrams to illustrate the operation of the inductor detector sub-system 16 when no inductor 26 is present at the output of the power supply module 12.

The upper three traces in FIG. 3 are identical to the corresponding traces of FIG. 2. The fourth trace in FIG. 3 shows the output of the flip flop 38 over the time period shown in the other traces when no inductor 26 is present at the output 24 of the power supply module 12. In this case, the voltage at the output 24 of the power supply module 12 rises from zero with a time constant equal to RC as the capacitor 40 charges up though the resistance provided by the switch 22 when it is switched on.

The fifth trace in FIG. 3 shows the output of the flip flop 38 over the time period shown in the other traces of FIG. 3. It can be seen that the output of the flip flop 38 remains low throughout the period. This is because at the expiry of the time period of the timer 34 the voltage at the output 24 of the power supply module 12 is below the reference voltage VREF at the inverting input of the comparator 36, and thus the output of the flip flop 38 latches low. This in turn causes the start-up sequencer 14 to disable the switch mode controller 20 and enable the linear mode controller 18. Again, this delay in outputting a signal from the flip flop 38 to the start-up sequencer 14 ensures that voltage spikes that may arise when the switch 22 is initially closed do not cause the start-up sequencer 14 incorrectly to enable the switch mode controller 20.

The power supply module 12 may have a switching frequency of around 8 MHz in its switch mode. A suitable value for the inductor 26 for correct operation of the power supply module 12 in switch mode is between 1 microhenry and 2.2 microhenries, whilst a suitable value for the capacitor is 1 microfarad to 2.2 microfarads. The on resistance of the switch 22 should be less than a few tens of ohms, for example 20 ohms.

The detection window is determined by the time taken for the inductor 26 to charge and therefore the voltage at the output 24 to drop from almost the external supply voltage VSUP to 0. This is determined by the time constant L/R, which, for an inductor with a value of 2.2 microhenries and a switch with an on resistance of 20 ohms is 110 nanoseconds. A time period slightly smaller than this, for example around 100 nanoseconds, may be selected as the predetermined time period of the timer 34, which defines the detection window of the power supply module 12.

The time constant for the capacitor 40 to charge up through the on resistance of the switch 22, for a capacitor with a value of 2.2 microfarads and a switch on resistance of 20 ohms, is 44 microseconds. As this is an order of magnitude greater than the detection window there is no chance of false detection of an inductor 26 due to the capacitor charging to the reference voltage VREF and causing the output of the comparator 36 to change.

As the signal output by the timer 34 is input to the strobe input of the flip flop 28, at the end of the detection window defined by the timer 34, when the signal input to the strobe input of the flip flop 28 goes low, the output QB of the flip flop 28 also goes low. This causes the output of the AND gate 30 to go low, which in turn causes the output of the NOT gate 32 to go high, switching off the switch 22. Thus, once the detection window has elapsed the power supply module 12 is ready to implement whichever operating mode is selected.

At the end of the detection window defined by the timer 34, the output of the flip flop 38 remains in its latched condition (i.e. high if an inductor 26 is present at the output 24 or low if no inductor 26 is present) until it is reset. A reset input (RB) of the flip flop 38 is connected to the Detection Enable output of the start-up sequencer 14, such that when the start-up sequencer 14 outputs a Detect Enable signal to trigger the inductor detection sub system 16 the flip flop 38 is reset and is thus initialized for use in indicating the presence or absence of an inductor 26 at the output 24 of the power supply module 12.

The power supply module 12 described above with reference to the accompanying drawings provides a cost effective system for determining the correct operating mode for a power supply module, by automatically detecting the presence or absence of an inductor at an output of the power supply module 12 and selecting the operating mode of the power supply module 12 accordingly. As the detection window is small (typically of the order of 100 nanoseconds) the effect of this automatic detection of the presence of an inductor 26 and subsequent setting of the operating mode of the power supply module 12 on the start-up time of the chip 10 is negligible.

The power supply module 12 does not require a costly and physically large one time programmable element, thereby reducing the cost and physical size of a device such as a chip incorporating the power supply module 12. Additionally, as there is no one-time programmable element, there is no need to reserve pins on the chip for programming such an element, whilst production and post-production testing of the device are facilitated, as there is no need to program a one time programmable device during production or testing.

Although the description above and the accompanying drawings refer to a power supply module in the context of a chip, it will be appreciated that the power supply module described herein is equally suitable for off-chip applications.

The invention claimed is:

1. A dual mode power supply module comprising:
a switch operable to connect an output node of the power supply module to a power supply of the power supply module;
a detector for detecting a signal at the output node indicative of the presence or absence of an inductor at the output node; and
means for selecting either a first operating mode or a second operating mode of the dual mode power supply module according to a signal output by the detector, wherein if the signal at the output node is indicative of the presence of an inductor the first operating mode is selected and if the signal at the output node is indicative of the absence of an inductor the second operating mode is selected, and wherein in the first operating mode the dual mode power supply is configured to operate as a switch mode power supply only and in the second operating mode the dual mode power supply is configured to operate as a linear mode power supply only;
wherein the signal at the output node that is indicative of the presence of an inductor is governed by a first time constant; and
wherein the signal at the output node that is indicative of the absence of an inductor is governed by a second time constant, wherein the first time constant is different from the second time constant.

2. The dual mode power supply module according to claim 1 wherein the detector is configured to compare a voltage at the output node to a reference voltage.

3. The dual mode power supply according to claim 2 wherein the detector is configured to output a signal indicative of the presence of an inductor at the output node if the voltage at the output node is greater than the reference voltage.

4. The dual mode power supply according to claim 2 wherein the detector is configured to output a signal indicative of the absence of an inductor at the output node if the voltage at the output node is less than the reference voltage.

5. The dual mode power supply according to claim 3 further comprising a latch which receives the output of the detector and outputs a signal indicative of the presence or absence of an inductor at the output node after a predetermined time period.

6. The dual mode power supply according to claim 5 wherein the predetermined time period is defined by a timer.

7. The dual mode power supply according to claim 6 wherein the timer is configured to commence when the switch is operated to connect the output node to the power supply of the power supply module.

8. The dual mode power supply according to claim 1 wherein the detector comprises a comparator.

9. The dual mode power supply module according to claim 1, wherein the first time constant is selected such that the first signal crosses a reference threshold within a detection window time period and the second time is selected such that the second signal does not cross the reference threshold within the detection window time period.

10. The dual mode power supply module according to claim 9, wherein the first time constant is governed by an on-resistance of the switch and the inductance at the output node, and wherein the second time constant is governed by an on-resistance of the switch and a capacitance of a capacitor connected between the output node and ground.

11. A method of operating a dual mode power supply module, the method comprising:
connecting an output node of the power supply module to a power supply of the power supply module;
detecting a signal at the output node indicative of the presence or absence of an inductor at the output node; and
selecting either a first operating mode or a second operating mode of the dual mode power supply module according to a signal output by the detector, wherein if the signal at the output node is indicative of the presence of an inductor the first operating mode is selected and if the signal at the output node is indicative of the absence of an inductor the second operating mode is selected, and wherein in the first operating mode the dual mode power supply is configured to operate as a switch mode power supply only and in the second operating mode the dual mode power supply is configured to operate as a linear mode power supply only;
wherein the signal at the output node that is indicative of the presence of an inductor is governed by a first time constant; and
wherein the signal at the output node that is indicative of the absence of an inductor is governed by a second time constant, wherein the first time constant is different from the second time constant.

12. The method according to claim 11 wherein the detecting the signal at the output node comprises comparing a voltage at the output node to a reference voltage.

13. The method according to claim 12 further comprising outputting a signal indicative of the presence of an inductor at the output node if the voltage at the output node is greater than the reference voltage.

14. The method according to claim 12 further comprising outputting a signal indicative of the absence of an inductor at the output node if the voltage at the output node is less than the reference voltage.

15. The method according to claim 13 further comprising receiving the signal indicative of the presence or absence of an inductor at an input of a latch and outputting at an output of the latch a signal indicative of the presence or absence of an inductor after a predetermined time period.

16. The method according to claim 15 wherein the predetermined time period is defined by a timer.

17. The method according to claim 16 further comprising commencing operation of the timer when the output node is connected to the power supply of the power supply module.

18. The method according to claim 11 wherein detection of the voltage at the output node is performed by a comparator.

19. The method of operating a dual mode power supply module according to claim 11, comprising:

selecting the first time constant such that the first signal crosses a reference threshold within a detection window time period; and selecting the second time such that the second signal does not cross the reference threshold within the detection window time period.

20. The method of operating a dual mode power supply module according to claim 19, wherein the first time constant is governed by an on-resistance of the switch and the inductance at the output node, and wherein the second time constant is governed by an on-resistance of the switch and a capacitance of a capacitor connected between the output node and ground.

* * * * *